United States Patent
Sharifi

(10) Patent No.: US 10,621,987 B2
(45) Date of Patent: *Apr. 14, 2020

(54) PROVIDING PRE-COMPUTED HOTWORD MODELS

(71) Applicant: Google LLC, Mountain View, CA (US)

(72) Inventor: Matthew Sharifi, Kilchberg (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/669,503

(22) Filed: Oct. 30, 2019

(65) Prior Publication Data

US 2020/0066275 A1    Feb. 27, 2020

Related U.S. Application Data

(63) Continuation of application No. 16/529,300, filed on Aug. 1, 2019, now Pat. No. 10,497,373, which is a
(Continued)

(51) Int. Cl.
*G10L 15/00* (2013.01)
*G10L 15/22* (2006.01)
(Continued)

(52) U.S. Cl.
CPC .............. *G10L 15/22* (2013.01); *G06F 3/167* (2013.01); *G10L 15/063* (2013.01); *G10L 15/08* (2013.01);
(Continued)

(58) Field of Classification Search
CPC ... G10L 15/22; G10L 2015/223; G10L 15/30; G10L 2015/088; G06F 3/167
(Continued)

(56) References Cited

U.S. PATENT DOCUMENTS 6,026,491 A * 2/2000 Hiles ....................... G06F 21/31
726/18
7,668,718 B2 * 2/2010 Kahn .................... G10L 15/063
704/270
(Continued)

FOREIGN PATENT DOCUMENTS

EP        1884923 A1    2/2008

OTHER PUBLICATIONS

Ahmed et al, "Training Hierarchical Feed-Forward Visual Recognition Models Using Transfer Learning from Pseudo-Tasks.." ECCV 2008, Part III, LNCS 5304.. 69-82, 2008.
(Continued)

*Primary Examiner* — Charlotte M Baker

(74) *Attorney, Agent, or Firm* — Honigman LLP

(57) ABSTRACT

Methods, systems, and apparatus, including computer programs encoded on a computer storage medium, for obtaining, for each of multiple words or sub-words, audio data corresponding to multiple users speaking the word or sub-word; training, for each of the multiple words or sub-words, a pre-computed hotword model for the word or sub-word based on the audio data for the word or sub-word; receiving a candidate hotword from a computing device; identifying one or more pre-computed hotword models that correspond to the candidate hotword; and providing the identified, pre-computed hotword models to the computing device.

20 Claims, 4 Drawing Sheets

Related U.S. Application Data continuation of application No. 16/216,752, filed on Dec. 11, 2018, now Pat. No. 10,446,153, which is a continuation of application No. 15/875,996, filed on Jan. 19, 2018, now Pat. No. 10,186,268, which is a continuation of application No. 15/463,786, filed on Mar. 20, 2017, now Pat. No. 9,911,419, which is a continuation of application No. 15/288,241, filed on Oct. 7, 2016, now Pat. No. 9,646,612, which is a continuation of application No. 15/001,894, filed on Jan. 20, 2016, now Pat. No. 9,520,130, which is a continuation of application No. 14/340,833, filed on Jul. 25, 2014, now Pat. No. 9,263,042.

(51) Int. Cl.

| | |
|---|---|
| *G10L 15/08* | (2006.01) |
| *G10L 15/26* | (2006.01) |
| *G10L 15/06* | (2013.01) |
| *G10L 15/30* | (2013.01) |
| *G06F 3/16* | (2006.01) |
| *G06F 3/0484* | (2013.01) |
| *G10L 15/18* | (2013.01) |

(52) U.S. Cl.
CPC ............ *G10L 15/265* (2013.01); *G10L 15/30* (2013.01); *G06F 3/04842* (2013.01); *G10L 15/18* (2013.01); *G10L 2015/0631* (2013.01); *G10L 2015/0638* (2013.01); *G10L 2015/088* (2013.01); *G10L 2015/223* (2013.01)

(58) Field of Classification Search
USPC .......................................... 704/235, 270, 275
See application file for complete search history.

(56) References Cited

U.S. PATENT DOCUMENTS

| | | | |
|---|---|---|---|
| 7,712,031 B2 | 5/2010 | Law et al. | |
| 8,548,812 B2 | 10/2013 | Whynot | |
| 8,719,039 B1 | 5/2014 | Sharifi | |
| 8,768,712 B1 | 7/2014 | Sharifi | |
| 8,843,376 B2 * | 9/2014 | Cross, Jr. ............... | G06F 16/957 704/275 |
| 8,924,219 B1 | 12/2014 | Bringert et al. | |
| 9,031,847 B2 | 5/2015 | Sarin et al. | |
| 9,263,042 B1 | 2/2016 | Sharifi | |
| 9,536,528 B2 | 1/2017 | Rubin et al. | |
| 2008/0059188 A1 | 3/2008 | Konopka et al. | |
| 2008/0082338 A1 * | 4/2008 | O'Neil ................... | A61B 5/145 704/275 |
| 2013/0289994 A1 | 10/2013 | Newman et al. | |
| 2014/0012586 A1 | 1/2014 | Rubin et al. | |
| 2017/0193995 A1 | 7/2017 | Sharifi | |

OTHER PUBLICATIONS

Bengio, "Deep Learning of Representations for Unsupervised and Transfer Learning," JMRL: Workshop and Conference Proceedings 27:17-37, 2012.
Caruana, "Multitask Learning," CIVIU-CS-97-203 paper, School of Computer Science, Carnegie Mellon University, Sep. 23, 1997, 255 pages.
Caruana, "Multitask Learning," Machine Learning, 28, 41-75 (1997).
Ciresan et al., "Transfer learning for Latin and Chinese characters with Deep Neural Networks," The 2012 International Joint Conference on Neural Networks (IJCNN), Jun. 10-15, 2012, 1-6 (abstract only), 2 pages.
Collobert et al., "A Unified Architecture for Natural Language Processing: Deep Neural Networks with Multitask Learning," Proceedings of the 25th International Conference on Machine Learning, Helsinki, Finland, 2008, 8 pages.
Dahl et al., "Large Vocabulary Continuous Speech Recognition with Context-Dependent DBN-HMMS," IEEE, May 2011, 4 pages.
Dean et al, "Large Scale Distributed Deep Networks," Advances in Neural Information Processing Systems 25, 2012, 1-11.
Fernandez et al. "An application of recurent neural network to discriminative keyword spotting," ICANN'07 Proceedings of the 17th international conference on Artificial neural networks, 2007, 220-229.
Grangier et al, "Discriminative Keyword Spotting" Speech and Speaker Recognition: Large Margin and Kernel Methods, 2001, 1-23.
Heigold et al., "Multilingual Acoustic Models Using Distributed Deep Neural Networks," 2013 IEEE International Conference on Acoutics, Speech and Signal Processing (ICASSP), May 26-31, 2013, 8619-8623.
Huang et al., "Cross-language knowledge transfer using multilingual deep neural network with shared hidden layers", in Proc. ICASSP, 2013, 7304-7308.
Hughes et al., "Recurrent Neural Networks for Voice Activity Detection", ICASSP 2013, IEEE 2013, 7378-7382.
Jaitly et al., "Application of Pretrained Deep Neural Networks to Large Vocabulary Conversational Speech Recognition," Department of Computer Science, University of Toronto, UTML TR 2012-001, Mar. 12, 2012, 11 pages.
Le et al., "Building High-level Features Using Large Scale Unsupervised Learning," Proceedings of the 29th International Conference on Machine Learning, Jul. 12, 2012, 11 page.
Lei et al, "Accurate and Compact Large Vocabulary Speech Recognition on Mobile Devices," INTERSPEECH 2013, Aug. 25-29, 2013, 662-665.
Li et al., "A Whole World Recurent Neural Network for Keyword Spotting," IEEE 1992, 81-84.
Mamou et al., "Vocabulary Independent Spoken Term Detection," SIGIR'07, Jul. 23-27, 2007, 8 page.
Miller et al., "Rapid and Accurate Spoken Term Detection .," Interspeech 2007, Aug. 27-31, 2007, 314-317.
Parlak et al., "Spoken Term Detection for Turkish Broadcast News," ICASSP, IEEE, 2008, 5244- 5247.
Rohlicek et al., "Continuous Hidden Markov Modeling for Speaker-Independent Word Spotting." IEEE 1989, 627-630.
Rose et al., "A Hidden Markov Model Based Keyword Recognition System," IEEE 1990, 129-132.
Schalkwyk et al., "Google Search by Voice: A case study," 1-35, 2010.
Science Net [online]. "Deep Learning Workshop ICML 2013." Oct. 29, 2013 [retrieved on Jan. 24, 2014]. Retrieved from the internet URL<http://blog.sciencenet.cn/blog-701243-737140.html.>, 13 pages.
Silaghi et al., "Iterative Posterior-Based Keyword Spotting Without Filler Models," IEEE 1999, 4 pages.
Silaghi, "Spotting Subsequences matching a HMM using the Average Observation Probability Criteria With application to Keyword Spotting," American Association for Artificial Intelligence, 1118-1123, 2005.
Srivastava et al., "Dicriminative Tranfer Learning with Tree-based Priors," Advances in Neural Information Processing Systems 26 (NIPS 2013).. 12 pages.
Sutton et al., "Composition of Conditional Random Fields for Transfer Learning," In Proceedings of HLT/EMNLP, 2005, 7 pages.
Swietojanski et al., "Unsupervised cross-lingual knowledge transfer in DNN-based LVCSR," In Proc. IEEE Workhop on Spoken Language Technology, Miami, Florida, USA, Dec. 2012, 6 pages.
Tabibian et al., An Evolutionary based discriminative system for keyword spotting. IEEE, 83-88, 2011.
Weintraub, "Keyword-Spotting Using SRI'S DECIPHER™ Large—Vocabuarly Speech-Recognition System."IEEE 1993. 463-466.
Wilpon et al., "Improvements and Applications for Key Word Recognition Using Hidden Markov Modeling Techniques," IEEE 1991, 309-312.

(56) References Cited

OTHER PUBLICATIONS

Yu et al., "Deep Learning with Kernel Regularization for Visual Recognition," Advances in Neural Information Processing System 21, Annual Conference on Neural Information Processing Systems, Dec. 8-1 I , 2008 I-8.
Zeiler et al., "On Rectified Linear Units for Speech Processing," ICASSP, p. 3517-3521, 2013.
Zhang et al., "Transfer Learning for Voice Activity Detection: A Denoising Deep Neural Network Perspective," INTERSPEECH2013, Mar. 8, 2013, 5 pages.
International Search Report and Written Opinion in International Application No. PCT/US2015/030501, dated Jul. 30, 2015, 9 pages.
European Search Report in European Application No. 16181747.3, dated Sep. 30, 2016, 7 page.
Office Action issued in European Application No. I 5725946.6, dated Nov. 3, 2017, 4 pages.
Office Action issued European Application No. 16181747.3, dated Jan. 3, 2017, 5 pages.
European Search Report for the related EP application No. 19170707.4 dated Jul. 4, 2019.

\* cited by examiner

PROVIDING PRE-COMPUTED HOTWORD MODELS

CROSS-REFERENCE TO RELATED APPLICATIONS

This application is a continuation of, and claims priority under 35 U.S.C. § 120 from, U.S. patent application Ser. No. 16/529,300, filed on Apr. 1, 2019, which is a continuation of U.S. patent application Ser. No. 16/216,752, filed on Dec. 11, 2018, which is a continuation of U.S. patent application Ser. No. 15/875,996, filed on Jan. 19, 2018, which is a continuation of U.S. application Ser. No. 15/463,786, filed on Mar. 20, 2017, which is a continuation of U.S. application Ser. No. 15/288,241, filed on Oct. 7, 2016, which is a continuation of U.S. application Ser. No. 15/001,894, filed on Jan. 20, 2016, which is a continuation of U.S. application Ser. No. 14/340,833, filed on Jul. 25, 2014. The disclosures of the prior applications are considered part the disclosure of this application and are hereby incorporated by reference in their entireties.

FIELD

The present disclosure generally relates to speech recognition.

BACKGROUND

The reality of a speech-enabled home or other environment—that is, one in which a user need only speak a query or command out loud and a computer-based system will field and answer the query and/or cause the command to be performed—is upon us. A speech-enabled environment (e.g., home, workplace, school, etc.) can be implemented using a network of connected microphone devices distributed throughout the various rooms or areas of the environment. Through such a network of microphones, a user has the power to orally query the system from essentially anywhere in the environment without the need to have a computer or other device in front of him/her or even nearby. For example, while cooking in the kitchen, a user might ask the system "how many milliliters in three cups?" and, in response, receive an answer from the system, e.g., in the form of synthesized voice output. Alternatively, a user might ask the system questions such as "when does my nearest gas station close," or, upon preparing to leave the house, "should I wear a coat today?"

Further, a user may ask a query of the system, and/or issue a command, that relates to the user's personal information. For example, a user might ask the system "when is my meeting with John?" or command the system "remind me to call John when I get back home."

In a speech-enabled environment, a user's manner of interacting with the system is designed to be primarily, if not exclusively, by means of voice input. Consequently, a system which potentially picks up all utterances made in the environment, including those not directed to the system, must have some way of discerning when any given utterance is directed at the system as opposed, e.g., to being directed an individual present in the environment. One way to accomplish this is to use a "hotword" (also referred to as an "attention word" or "voice action initiation command"), which by agreement is reserved as a predetermined term that is spoken to invoke the attention of the system.

In one example environment, the hotword used to invoke the system's attention is the word "Google." Consequently, each time the word "Google" is spoken, it is picked up by one of the microphones, and is conveyed to the system, which performs speech recognition techniques to determine whether the hotword was spoken and, if so, awaits an ensuing command or query. Accordingly, utterances directed at the system take the general form [HOTWORD] [QUERY], where "HOTWORD" in this example is "Google" and "QUERY" can be any question, command, declaration, or other request that can be speech recognized, parsed and acted on by the system, either alone or in conjunction with a server over network.

SUMMARY

According to some innovative aspects of the subject matter described in this specification, a system can provide pre-computed hotword models to a mobile computing device, such that the mobile computing device can detect a candidate hotword spoken by a user associated with the mobile computing device through an analysis of the acoustic features of a portion of an utterance, without requiring the portion to be transcribed or semantically interpreted. The hotword models can be generated based on audio data obtained from multiple users speaking multiple words or sub-words, including words or sub-words that make up the candidate hotword.

In some examples, a user desires to make the words "start computer" a hotword to initiate a "wake up" process on a mobile computing device, such as a smartphone. The user speaks the words "start computer" and, in response, the system can identify pre-computed hotword models associated with the term "start computer," or of the constituent words "start" and "computer." The system can provide the pre-computed hotword models to the mobile computing device such that the mobile computing device can detect whether a further utterance corresponds to the hotword "start computer," and correspondingly wake up the mobile computing device.

Innovative aspects of the subject matter described in this specification may be embodied in methods that include the actions of obtaining, for each of multiple words or sub-words, audio data corresponding to multiple users speaking the word or sub-word; training, for each of the multiple words or sub-words, a pre-computed hotword model for the word or sub-word based on the audio data for the word or sub-word; receiving a candidate hotword from a computing device; identifying one or more pre-computed hotword models that correspond to the candidate hotword; and providing the identified, pre-computed hotword models to the computing device.

Other embodiments of these aspects include corresponding systems, apparatus, and computer programs, configured to perform the actions of the methods, encoded on computer storage devices.

These and other embodiments may each optionally include one or more of the following features. For instance, identifying the one or more pre-computed hotword models includes obtaining two or more sub-words that correspond to the candidate hotword; and obtaining, for each of the two or more sub-words that correspond to the candidate hotword, a pre-computed hotword model that corresponds to the sub-word. Receiving the candidate hotword from the computing device after training, for each of the multiple words or sub-words, the pre-computed hotword model for the word or sub-word. Receiving the candidate hotword from the mobile computing includes receiving audio data corresponding to the candidate hotword. Receiving the candidate hotword from the computing device includes receiving the candidate hotword including two or more words from the computing device. Identifying one or more pre-computed hotword models that correspond to each word of the two or more words of the candidate hotword; and providing the identified, pre-computed hotword models that correspond to each word of the two or more words of the candidate hotword to the computing device. Providing, to the computing device, instructions defining a processing routine of the identified, pre-computed hotword models that correspond to each word of the two or more words of the candidate hotword. The instructions include instructions to sequentially process the identified, pre-computed hotword models that correspond to each word of the two or more words of the candidate hotword. The instructions include a processing order to sequentially process the identified, pre-computed hotword models that correspond to each word of the two or more words of the candidate hotword.

The features further include, for instance, dynamically creating one or more hotword models that correspond to one or more words of the two or more words of the candidate hotword; and providing the dynamically created one or more hotword models that correspond to one or more words of the two or more words of the candidate hotword to the computing device. Dynamically creating the one or more hotword models that correspond to the one or more words of the two or more words of the candidate hotword after receiving the candidate hotword from the computing device. Training, for each of the multiple words or sub-words, the pre-computed hotword model for the word or sub-word, further includes for each word or sub-word of the multiple words or sub-words, obtaining, for each user of the multiple users, a transcription of the audio data of the user speaking the word or sub-word; associating, for each user of the multiple users, the audio data of the user speaking the word or sub-word with the transcription of the audio data of the user speaking the word or sub-word; and generating a particular pre-computed hotword model corresponding to the word or sub-word based on i) the audio data corresponding to each of the multiple users speaking the word or sub-word and ii) the transcription associated with the audio data corresponding to each of the multiple users speaking the word or sub-word.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

In the drawings, like reference symbols indicate like elements throughout.

DETAILED DESCRIPTION

Figure 1:
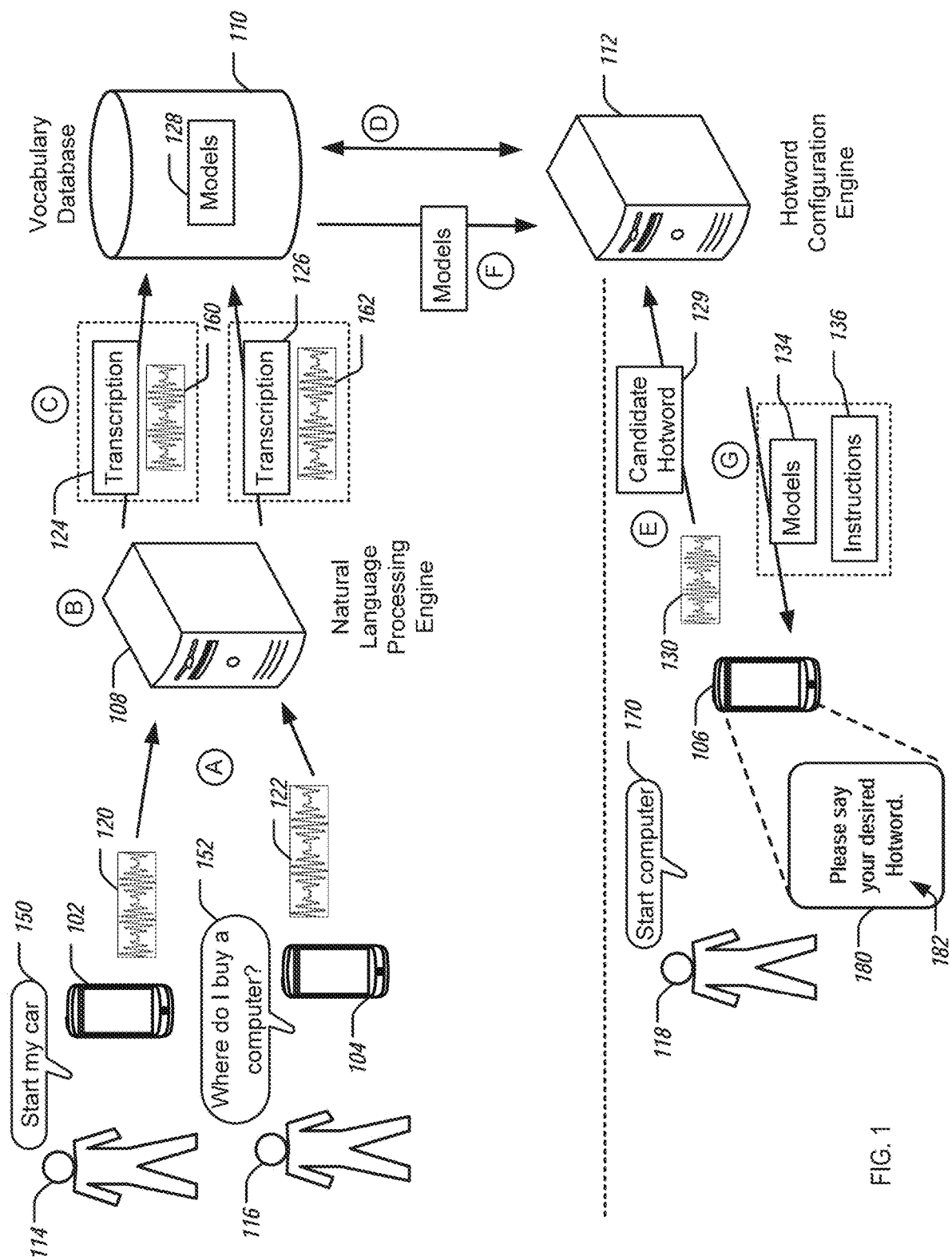
FIG. 1 depicts an example system for providing hotword models.

FIG. 1 depicts a system 100 for providing pre-computed hotword models. In some examples, the system 100 includes mobile computing devices 102, 104, 106, a speech recognition engine 108, a vocabulary database 110, and a hotword configuration engine 112. In some examples, any of the mobile computing devices 102, 104, 106 may be a portable computer, a smartphone, a tablet-computing device, or a wearable computing device. Each of the mobile computing devices 102, 104, 106 are associated with a respective user 114, 116, 118. The mobile computing devices 102, 104, 106 can include any audio detection means, e.g., a microphone, for detecting utterances from the respective associated user 114, 116, 118. The mobile computing devices 102 and 104 are in communication with the speech recognition engine 108, e.g., over one or more networks, and the mobile computing device 106 is in communication with the hotword configuration engine 112, e.g., over one or more networks.

In some implementations, the speech recognition engine 108 obtains, for each of multiple words or sub-words, audio data that corresponds to multiple users speaking the word or sub-words, during operation (A). Specifically, the speech recognition engine 108 obtains audio data from the mobile computing devices 102 and 104 that correspond, respectively, to the users 114 and 116 speaking words or sub-words, e.g., over one or more networks. In some examples, the user 114 and the user 116 each say one or more words that the mobile computing device 102 and mobile computing device 104, respectively detect. In some examples, the users 114 and 116 speak the words or sub-words during any interaction with the mobile computing devices 102 and 104, respectively, e.g., submitting voice queries for voice commands. In some examples, in addition to obtain the audio data associated with the users 114 and 116 speaking the words or sub-words, the speech recognition engine 108 obtains a locale of the users 114 and 116 from the mobile computing device 102 and 104. The locale can include the approximate current location of the user when speaking the words or sub-words, or a location associated with a profile of the user.

For example, the user 114 says the utterance 150 of "start my car" and the user 116 says the utterance 152 of "where do I buy a computer?" The mobile computing device 102 detects the utterance 150 of "start my car" to generate waveform data 120 that represents the detected utterance 150; and the mobile computing device 104 detects the utterance 152 of "where do I buy a computer?" to generate waveform data 122 that represents the detected utterance 152. The mobile computing devices 102 and 104 transmit the waveforms 120 and 122, respectively, to the speech recognition engine 108, e.g., over one or more networks.

In some examples, the speech recognition engine 108, for each word or sub-word of the multiple words or sub-words, obtains, for each user of the multiple users, a transcription of the audio data of the user speaking the word or the sub-word, during operation (B). Specifically, the speech recognition engine 108 processes the received audio data, including generating a transcription of an utterance of words or sub-words associated with the audio data. Generating the transcription of the audio data of the user speaking the word or the sub-word can include transcribing the utterance into text or text-related data. In other words, the speech recognition engine 108 can provide a representation of natural language in written form of the utterance associated with the audio data. For example, the speech recognition engine 108 transcribes the waveforms 120 and 122, as received from the mobile computing devices 102 and 104, respectively. That is, the speech recognition engine 108 transcribes the waveform 120 to generate the transcription 124 of "start my car"

and transcribes the waveform 122 to generate the transcription 126 of "where do I buy a computer?"

In some examples, the speech recognition engine 108, for each word or sub-word of the multiple words or sub-words, associates, for each user of the multiple users, the audio data of the user speaking the word or sub-word with the transcription of the audio data of the user speaking the word or sub-word, during operation (C). For example, the speech recognition engine 108 associates the waveform 160 with the transcription 124 and associates the waveform 162 with the transcription 126. In some examples, the waveform 160 is substantially the same as the waveform 120, and the waveform 162 is substantially the same as the waveform 122. In some examples, the waveform 160 is a processed version (e.g., by the speech recognition engine 108) of the waveform 120, and the waveform 162 is a processed version (e.g., by the speech recognition engine 108) of the waveform 122.

In some examples, the speech recognition engine 108 associates a portion of the waveform 160 with a corresponding portion of the transcription 124. That is, for each word, or sub-word, of the waveform 160, the speech recognition engine 108 associates the corresponding portion of the transcription 124 with the word, or sub-word. For example, the speech recognition engine 108 associates a portion of the waveform 160 for each of the words "start," "my," "car" with the corresponding portion of the transcription 124. Similarly, the speech recognition engine 108 associates a portion of the waveform 162 for each of the words "where," "do," "I," "buy," "a," "computer" with the corresponding portion of the transcription 126. In some examples, the speech recognition engine 108 associates a portion of the waveform 160 for each of the sub-words, e.g., phoneme or tri-phone level, of each word, e.g., "st-ah-rt" of the word "start," with the corresponding portion of the transcription. Similarly, in some examples, the speech recognition engine 108 associates a portion of the waveform 162 for each of the sub-words, e.g., phoneme or tri-phone level, of each word, e.g., "kom-pyu-ter" of the word "computer," with the corresponding portion of the transcription."

In some examples, associating the audio data of the user speaking the word or sub-word with the transcription of the audio data of the user speaking the word or sub-word includes storing the association in a database, or a table. Specifically, the speech recognition engine 108 provides the transcription 124 and the waveform 160 to the vocabulary database 110 such that the vocabulary database 110 stores an association between the waveform 160 and the transcription 124. Similarly, the speech recognition engine 108 provides the transcription 126 and the waveform 162 to the vocabulary database 110 such that the vocabulary database 110 stores an association between the waveform 162 and the transcription 126.

In some examples, the speech recognition engine 108 provides the locale associated with the word or sub-words of the transcription 124 (e.g., the locale of the user 114) to the vocabulary database 110 such that the vocabulary database 110 additionally stores an association between the waveform 160, the transcription 124, and the respective locale. Similarly, the speech recognition engine 108 provides the locale associated with the word or sub-words of the transcription 126 (e.g., the locale of the user 116) to the vocabulary database 110 such that the vocabulary database 110 additionally stores an association between the waveform 162, the transcription 126, and the respective locale In some examples, the vocabulary database 110 indicates an association between a portion of the waveform 160 with a corresponding portion of the transcription 124. That is, for each word, or sub-word, of the waveform 160, the vocabulary database 110 stores an association of the portion of the waveform 160 with a corresponding portion of the transcription 124 with the word, or sub-word. For example, the vocabulary database 110 stores an association of a portion of the waveform 160 for each of the words "start," "my," "car" with the corresponding portion of the transcription 124. Similarly, the vocabulary database 110 stores an association of a portion of the waveform 162 for each of the words "where," "do," "I," "buy," "a," "computer" with the corresponding portion of the transcription 126.

In some implementations, the hotword configuration engine 112 trains, for each of the multiple words or sub-words, a pre-computed hotword model for the word or sub-word, during operation (D). Specifically, the hotword configuration engine 112 is in communication with the vocabulary database 110, and obtains, for each word or sub-word stored by the vocabulary database 110, the audio data of each user of the multiple users speaking the word or sub-word and the associated transcription of the audio data. For example, the hotword configuration engine 112 obtains, from the vocabulary database 110, the waveform 160 and the associated transcription 124, and further obtains the waveform 162 and the associated transcription 126.

In some examples, for each word or sub-word stored by the vocabulary database 110, the hotword configuration engine 112 generates a pre-computed hotword model corresponding to the word or sub-word. Specifically, the hotword configuration engine 112 generates the pre-computed hotword model for each word or sub-word based on i) the audio data corresponding to each of the multiple users speaking the word or sub-word and ii) the transcription associated with the audio data corresponding to each of the multiple users speaking the word or sub-word. In some examples, the pre-computed hotword model can be a classifier such as a neural network, or a support vector machine (SVM).

For example, the hotword configuration engine 112 generates a pre-computed hotword model corresponding to each word or sub-word of the waveforms 160 and 162. In some examples, for the word "start" of the waveform 160, the hotword configuration engine 112 generates a pre-computed hotword model for the word based on i) the audio data corresponding to the user 114 speaking the word "start" (e.g., the portion of the waveform 160 corresponding to the user 114 speaking the word "start") and ii) the transcription associated with the audio data corresponding to the user 114 speaking the word "start." Additionally, the hotword configuration engine 112 can generate a pre-computed hotword model for the remaining words "my" and "car" of the waveform 160, as well as each sub-word (of each word) of the waveform 160, e.g., "st-ah-rt" of the word "start."

Additionally, in some examples, for the word "computer" of the waveform 162, the hotword configuration engine 112 generates a pre-computed hotword model for the word based on i) the audio data corresponding to the user 116 speaking the word "computer" (e.g., the portion of the waveform 162 corresponding to the user 116 speaking the word "computer") and ii) the transcription associated with the audio data corresponding to the user 116 speaking the word "computer." Additionally, the hotword configuration engine 112 can generate a pre-computed hotword model for the remaining words "where," "do," "I," "buy" and "a" of the waveform 162, as well as each sub-word of the waveform 160, e.g., "kom-pyu-ter" of the word "computer."

The hotword configuration engine 112, after pre-computing the hotword models for one or more words stored by the vocabulary database 110, provides the pre-computed hotword models 128 to the vocabulary database 110 such that the vocabulary database 110 stores or otherwise indicates an association between the words or sub-words and the corresponding pre-computed hotword models 128. That is, for each word or sub-word of the waveforms 160 and 162, the vocabulary database 110 stores an association between each of the words or sub-words (e.g., of the waveforms 160 and 162) and the corresponding pre-computed hotword models 128. In some examples, the vocabulary database 110 stores, for each word or sub-word of the waveforms 160 and 162, an association between i) the portion of the waveform corresponding to the word or sub-word, ii) the corresponding transcription of the portion of the waveform, and iii) the corresponding pre-computed hotword model. For example, for the word "start" of the waveform 160, the vocabulary database 110 stores i) an association of a portion of the waveform 160 corresponding to the word "start," ii) a portion of the transcription 124 corresponding to the word "start," and iii) a pre-computed hotword model 128 for the word "start."

In some implementations, the hotword configuration engine 112 receives a candidate hotword 129 from the mobile computing device 106, during operation (E). Specifically, the hotword configuration engine 112 receives, e.g., over one or more networks, data from the mobile computing device 106 that corresponds to the user 118 providing the candidate hotword 129. In some examples, the mobile computing device 106 provides a graphical user interface 180 to the user 118 that provides for display of text 182 to prompt the user 118 to provide a hotword. For example, the text 182 includes "Please say your desired Hotword." In response, the user 118 says the candidate hotword 129 that the mobile computing device 106 detects, and transmits to the hotword configuration engine 112. For example, the user 118 says the utterance 170 of "start computer" that corresponds to the candidate hotword 129. The mobile computing device 106 detects the utterance 170 of "start computer" and generates a waveform 130 that represents the detected utterance 170. The mobile computing device 106 transmits the waveform 130 to the hotword configuration engine 112, e.g., over one or more networks.

In some examples, the user 118 provides text-based input to the mobile computing device 106, e.g., via a graphical user interface of the mobile computing device 106, that corresponds to the candidate hotword 129. For example, the user 118 inputs via a keyboard, virtual or tactile, the text of "start computer." The mobile computing device 106 transmits the text-based candidate hotword 129 of "start computer" to the hotword configuration engine 112, e.g., over one or more networks.

In some examples, the hotword configuration engine 112 receives the candidate hotword from the mobile computing device 106 after training, for each of the multiple words or sub-words, the pre-computed hotword model for the word or sub-word. Specifically, the hotword configuration engine 112 receives the candidate hotword 129 from the mobile computing device 106 after the hotword configuration engine 112 generates the pre-computed hotword models 128 corresponding to each of the words or sub-words stored by the vocabulary database 110. For example, the hotword configuration engine 112 receives the candidate hotword 129 of "start computer" from the mobile computing device 106 after training, for each of the multiple words or sub-words of the waveforms 160 and 162, the pre-computed hotword models 128 for the word or sub-word.

In some examples, the hotword configuration engine 112 receives the candidate hotword 129 that includes two or more words from the mobile computing device 106. For example, the hotword configuration engine 112 receives the candidate hotword 129 of "start computer" that includes two words (e.g., "start" and "computer"). In some examples, the hotword configuration engine 112 receives the candidate hotword 129 that includes a single word from the mobile computing device 106.

In some examples, the hotword configuration engine 112 obtains two or more sub-words that correspond to the candidate hotword 129. That is, the hotword configuration engine 112 processes the candidate hotword 129 to identify sub-words of the candidate hotword 129. For example, for the candidate hotword 129 of "start computer," the hotword configuration engine 112 can obtain the sub-words of "st-ah-rt" for the word "start" of the candidate hotword 129 and further obtain the sub-words of "kom-pyu-ter" for the word "computer" of the candidate hotword 129.

In some implementations, the hotword configuration engine 112 identifies one or more pre-computed hotword models that correspond to the candidate hotword 129, at operation (F). Specifically, the hotword configuration engine 112 accesses the vocabulary database 110 to identify one or more of the pre-computed hotword models 128 that are stored by the vocabulary database 110 and that correspond to the candidate hotword 129. The hotword configuration engine 112 retrieves the pre-computed hotword models 128 from the vocabulary database 110, e.g., over one or more networks. In some examples, the hotword configuration engine 112 identifies the pre-computed hotword models 128 that are associated with the words, or sub-words, of the candidate hotword 129. The hotword configuration engine 112 can identify the pre-computed hotword models 128 by matching the words, or sub-words, of the candidate hotword 129 with the words, or sub-words, that are stored by the vocabulary database 110.

In some examples, the hotword configuration engine 112 identifies the pre-computed hotword models 128 that correspond to the utterance 170 of the candidate hotword 129 provided by the user 118. That is, the hotword configuration engine 112 identifies the one or more pre-computed hotword models 128 based on the waveform mel that represents the detected utterance 170 of the candidate hotword 129. In the illustrated example, the hotword configuration engine 112 identifies one or more pre-computed hotword models 128 stored by the vocabulary database 110 that correspond to the utterance 170 of "start computer."

In some examples, when the candidate hotword includes two or more words, the hotword configuration engine 112 identifies the pre-computed hotword models that correspond to each word of the two or more words. That is, each word of the two or more words of the candidate hotword 129 corresponds to a pre-computed hotword model 128 stored by the vocabulary database 110. For example, the candidate hotword 129 includes two words, e.g., "start" and "computer." To that end, the hotword configuration engine 112 identifies a first pre-computed hotword model 128 stored by the vocabulary database 110 corresponding to the word "start" and a second pre-computed hotword model 128 stored by the vocabulary database 110 corresponding to the word "computer." In some examples, the hotword configuration engine 112 identifies a pre-computed hotword model 128 stored by the vocabulary database 110 corresponding to the both words "start computer."

In some examples, the hotword configuration engine 112 identifies the one or more pre-computed hotword models 128 that correspond to the utterance 170 of the candidate hotword 129 by matching at least a portion of the waveform 130 to at least a portion of waveforms stored by the vocabulary database 110. Matching the waveform 130 to waveforms stored by the vocabulary database 110 can include performing an audio-based comparison between the waveform 130 and the waveforms stored by the vocabulary database 110 to identify a matching waveform stored by the vocabulary database 110 to the waveform 130. In some examples, the audio-based comparison between the waveform 130 and the waveforms stored by the vocabulary database 110 can be performed by an audio processing engine that is in communication with the hotword configuration engine 112, e.g., over one or more networks. To that end, upon the hotword configuration engine 112 identifying a matching waveform stored by the vocabulary database 110 to the waveform 130, the hotword configuration engine 112 identifies the pre-computed hotword models 128 associated with the matching waveform.

In some examples, the hotword configuration engine 112 identifies the one or more pre-computed hotword models 128 that correspond to the utterance 170 of the candidate hotword 129 by applying one or more of the pre-computed hotword models 128 stored by the vocabulary database 110 to the utterance 170 to identify the pre-computed hotword models 128 corresponding with a highest confidence score relative to the remaining pre-computed hotword models 128. The confidence score indicates the likelihood that the identified pre-computed hotword model 128 corresponds to the utterance 170.

For example, the hotword configuration engine 112 can match the waveform 130 to a portion of one or more of the waveforms 160 and 162 that are stored by the vocabulary database 110. Specifically, the hotword configuration engine 112 can match a portion of the waveform 130 that corresponds to the word "start" with a portion of the waveform 160 stored by the vocabulary database 110 that corresponds to the word "start." Based on this matching, the hotword configuration engine 112 can identify the corresponding pre-computed hotword model 128 that is associated with the portion of the waveform 160 for the word "start." Similarly, the hotword configuration engine 112 can match a portion of the waveform 130 that corresponds to the word "computer" with a portion of the waveform 162 stored by the vocabulary database 110 that corresponds to the word "computer." Based on this matching, the hotword configuration engine 112 can identify the corresponding pre-computed hotword model 128 that is associated with the portion of the waveform 162 for the word "computer."

In some examples, the hotword configuration engine 112 identifies the one or more pre-computed hotword models 128 that correspond to the utterance of the candidate hotword 129 by matching at least a portion of a transcription of the waveform 130 to at least a portion of transcriptions stored by the vocabulary database 110. Specifically, the hotword configuration engine 112 can provide the waveform 130 to a speech recognition engine, e.g., the speech recognition engine 108, such that speech recognition engine 108 transcribes the waveform 130. To that end, matching the transcription of the waveform 130 to transcriptions stored by the vocabulary database 110 can include comparing the transcription of the waveform 130 to the transcriptions stored by the vocabulary database 110 to identify a matching transcription stored by the vocabulary database 110 to the waveform 130. To that end, upon the hotword configuration engine 112 identifying a matching transcription stored by the vocabulary database 110 to the transcription of the waveform 130, the hotword configuration engine 112 identifies the pre-computed hotword models 128 associated with the matching transcription.

For example, the hotword configuration engine 112 can match the transcription of the waveform 130 to a portion of one or more of the transcriptions 124 and 126 that are stored by the vocabulary database 110. Specifically, the hotword configuration engine 112 can match a portion of the transcription of the waveform 130 that corresponds to the word "start" with a portion of the transcription 124 stored by the vocabulary database 110 that corresponds to the word "start." Based on this matching, the hotword configuration engine 112 can identify the corresponding pre-computed hotword model 128 that is associated with the portion of the transcription 124 for the word "start." Similarly, the hotword configuration engine 112 can match a portion of the transcription of the waveform 130 that corresponds to the word "computer" with a portion of the transcription 126 stored by the vocabulary database 110 that corresponds to the word "computer." Based on this matching, the hotword configuration engine 112 can identify the corresponding pre-computed hotword model 128 that is associated with the portion of the transcription 126 for the word "computer."

In some examples, matching the words, or sub-words, of the candidate hotword 129 with words, or sub-words, that are stored by the vocabulary database 110 can include determining a full match between the words, or sub-words, of the candidate hotword 129 with words, or sub-words that are stored by the vocabulary database 110. In some examples, matching the words, or sub-words, of the candidate hotword 129 with words, or sub-words, that are stored by the vocabulary database 110 can include determining a partial match between the words, or sub-words, of the candidate hotword 129 with words, or sub-words that are stored by the vocabulary database 110.

In some examples, the hotword configuration engine 112 obtains the pre-computed hotword models 128 for the sub-words that correspond to the candidate hotword 129. As mentioned above, for the candidate hotword 129 of "start computer," the hotword configuration engine 112 identifies the sub-words of "st-ah-rt" for the word "start" of the candidate hotword 129 and further identifies the sub-words of "kom-pyu-ter" for the word "computer" of the candidate hotword 129. To that end, the hotword configuration engine 112 accesses the vocabulary database 110 to identify the pre-computed hotword models 128 that are stored by the vocabulary database 110 and that correspond to the sub-words of the candidate hotword 129. The hotword configuration engine 112 can identify the pre-computed hotword models 128 by matching the sub-words of the candidate hotword 129 with the sub-words that are stored by the vocabulary database 110 and are associated with the pre-computed hotword models 128. For example, the hotword configuration engine 112 identifies the one or more pre-computed hotword models 128 stored by the vocabulary database 110 that correspond to the each of the sub-words of "st-ah-rt" for the word "start" of the candidate hotword 129 and each of the sub-words of "kom-pyu-ter" for the word "computer" of the candidate hotword 129.

In some implementations, the hotword configuration engine 112 provides the identified, pre-computed hotword models to the mobile computing device 106, at operation (G). Specifically, the hotword configuration engine 112 provides the pre-computed hotword models 134, e.g., a subset of the pre-computed hotword models 128, corresponding to the candidate hotword 129 to the mobile computing device 106, e.g., over one or more networks. For example, the hotword configuration engine 112 can provide the pre-computed hotword models 134 that correspond to the candidate hotword 129 of "start computer" to the mobile computing device 106.

In some examples, the hotword configuration engine 112 provides the identified, pre-computed hotword models 134 that correspond to each word of the two or more words of the candidate hotword 129 to the mobile computing device 106. For example, the candidate hotword 129 includes two words, e.g., "start" and "computer," and the hotword configuration engine 112 provides the pre-computed hotword models 134 that correspond to each word. That is, the hotword configuration engine 112 provides a first pre-computed hotword model 134 corresponding to the word "start" and a second pre-computed hotword model 134 corresponding to the word "computer" to the mobile computing device 106.

In some examples, the identified, pre-computed hotword models 134 are provided to the mobile computing device 106 based on a type of the mobile computing device 106. For example, a lower-end, or lower processing power, mobile computing device is more suitable to receive an appropriate version (e.g., smaller neural network) of the pre-computed hotword models 134 such that the mobile computing device is able to appropriately process the pre-computed hotword models 134.

In some examples, the mobile computing device 106 can receive two or more pre-computed hotword models 134 in response to a command (or query) from the user 118. That is, the user 118 can provide a command such as "navigate to coffee house" to the mobile computing device 106. In response, the mobile computing device 106 can receive pre-computed hotword models 134 that correspond to two differing locations of coffee houses that are proximate to the user's 118 current location. For example, the mobile computing device 106 can receive a pre-computed hotword model 135 for "Palo Alto" and a pre-computed hotword model 134 for "Mountain View." The mobile computing device 106 can provide both location options to the user 118 (e.g., via sound or the graphical user interface of the mobile computing device 106). The user 118 can provide an utterance of one of the locations that the mobile computing device 106 can detect via the received pre-computed hotword models 134, as described above.

In some examples, by generating the pre-computed hotword models 128 and providing the same to the vocabulary database 110, the pre-computed hotword models are instantaneously available (or nearly instantaneously available) for identifying hotwords from utterances, e.g., by the mobile computing device 106. For example, the mobile computing device 106 is able to instantaneously obtain the hotword models that correspond to the words "start" and "computer" such that the mobile computing device 106 is able to appropriately process the utterance 170 close to detection of utterance 170.

In some examples, by generating the pre-computed hotword models 128 trained on utterances of other users (e.g., users 114 and 116) that are not available to the mobile computing device 106, the pre-computed hotword models 128 employed by the mobile computing device 106 to process the utterance 170 can be more robust as compared to hotword models 128 trained on utterances only provided by the user 118.

In some examples, the hotword configuration engine 112 provides, to the mobile computing device 106, instructions 136 that define a processing routine of the pre-computed hotword models 134. That is, the instructions 136 define how the mobile computing device 106 is to appropriately process the pre-computed hotword models 134. In some examples, the pre-computed hotword models 134 detect hotwords (e.g., of utterances) based on an analysis of underlying acoustic features (e.g., mel-frequency cepstrum coefficients) of an input utterance (e.g., utterance 170).

In some examples, the instructions 136 include instructions to sequentially process the hotword models 134, and further include a processing order of the hotword models 134. For example, the instructions 136 can include instructions to initially process the pre-computed hotword model 134 corresponding to the word "start" and subsequently process the pre-computed hotword model 134 corresponding to the word "computer." In some examples, the instructions 136 include instructions to parallel process the hotword models 134. For example, the instructions 136 can include instructions to process the pre-computed hotword model 134 corresponding to the word "start" and process the pre-computed hotword model 134 corresponding to the word "computer" in parallel, e.g., at substantially the same time. In some examples, the instructions 136 include instructions to process the hotword models 134 such that a second hotword model 134 corresponding to the word "computer" is processed only when a first hotword model 134 detects the hotword "start." In other words, upon detection of the word "computer" by the first hotword model 134, the mobile computing device 106 triggers processing of the second hotword model 134 corresponding to the word "computer."

The mobile computing device 106 receives the pre-computed hotword models 134, and in some examples, the instructions 136, from the hotword configuration engine 112, e.g., over one or more networks. The mobile computing device 106 stores the pre-computed models 134 in memory of the mobile computing device 106. Thus, upon detection of an utterance by the user 118 at a later time (e.g., after receiving the pre-computed hotword models 134), the mobile computing device 106 can appropriately process the utterance in view of the pre-computed hotword models 134 to determine whether the utterance corresponds to the candidate hotword 129.

In some further implementations, the hotword configuration engine 112 dynamically creates one or more of the hotword models that correspond to candidate hotword 129. That is, in response to receiving the candidate hotword 129 from the mobile computing device 106, the hotword configuration engine 112 dynamically creates a hotword model that corresponds to one or more words of the candidate hotword 129. In some examples, the hotword configuration engine 112 dynamically creates the hotword models for the candidate hotword 129 based on i) the waveform 130 and ii) an obtained transcription of the waveform 130, e.g., from the speech recognition engine 108. For example, for the word "start" of the waveform 130, the hotword configuration engine 112 dynamically creates a hotword model for the word based on i) a portion of the waveform 130 corresponding to the user 118 speaking the word "start" and ii) a transcription associated with the waveform 130 corresponding to the user 118 speaking the word "start."

In some examples, as mentioned above, the hotword configuration engine 112 matches at least a portion of the waveform 130 to at least a portion of the waveforms stored by the vocabulary database 110. Upon the matching, the hotword configuration engine 112 can further identify a portion of the corresponding transcription associated with the matched waveform that is stored by the vocabulary database 110. To that end, the hotword configuration engine 112 dynamically creates the hotword model corresponding to the candidate hotword 129 based on i) the matched waveform and ii) the corresponding transcription associated with the matched waveform. For example, the hotword configuration engine 112 can identify a portion of the waveform 160 stored by the vocabulary database 110 corresponding to the word "start" and further identify the corresponding transcription 124 of the portion of the waveform 160 that includes the word "start." The hotword configuration engine 112 can dynamically create the hotword model for the word "start" of the candidate hotword 129 based on i) the portion of the waveform 160 stored by the vocabulary database 110 corresponding to the word "start" and ii) the corresponding transcription 124 that includes the word "start."

In some examples, as mentioned above, the hotword configuration engine 112 matches at least a portion of a transcription of the waveform 130 to at least a portion of transcriptions stored by the vocabulary database 110. Upon the matching, the hotword configuration engine 112 can further identify the corresponding waveform associated with the matched transcription that is stored by the vocabulary database 110. To that end, the hotword configuration engine 112 dynamically creates the hotword model corresponding to the candidate hotword 129 based on i) the matched transcription and ii) the corresponding waveform associated with the matched transcription. For example, the hotword configuration engine 112 can identify a portion of the transcription 124 stored by the vocabulary database 110 corresponding to the word "start" and further identify the corresponding portion of the waveform 160 that includes the word "start." The hotword configuration engine 112 can dynamically create the hotword model for the word "start" of the candidate hotword 129 based on i) the portion of the transcription 124 stored by the vocabulary database 110 corresponding to the word "start" and ii) the corresponding portion of the waveform 160 that includes the word "start."

In some examples, the hotword configuration engine 112 provides the dynamically created hotword models to the mobile computing device 106, e.g., over one or more networks. For example, the hotword configuration engine 112 can provide dynamically created hotword models 134 that correspond to the word "start" of the candidate hotword "start computer" to the mobile computing device 106. In some examples, the hotword configuration engine 112 can provide i) the dynamically created hotword model that corresponds to the word "start" of the candidate hotword 129 "start computer" and provide ii) the pre-computed hotword model 134 that corresponds to the word "computer" of the candidate hotword 129 "start computer" to the mobile computing device 106.

In some examples, the hotword configuration engine 112 dynamically creates the hotword models that correspond to the candidate hotword 129 after receiving the candidate hotword 129 from the mobile computing device 106. For example, the hotword configuration engine 112 dynamically creates the hotword models that correspond to the candidate hotword 129 of "start computer" after receiving the candidate hotword 129 from the mobile computing device 106.

Figure 2:
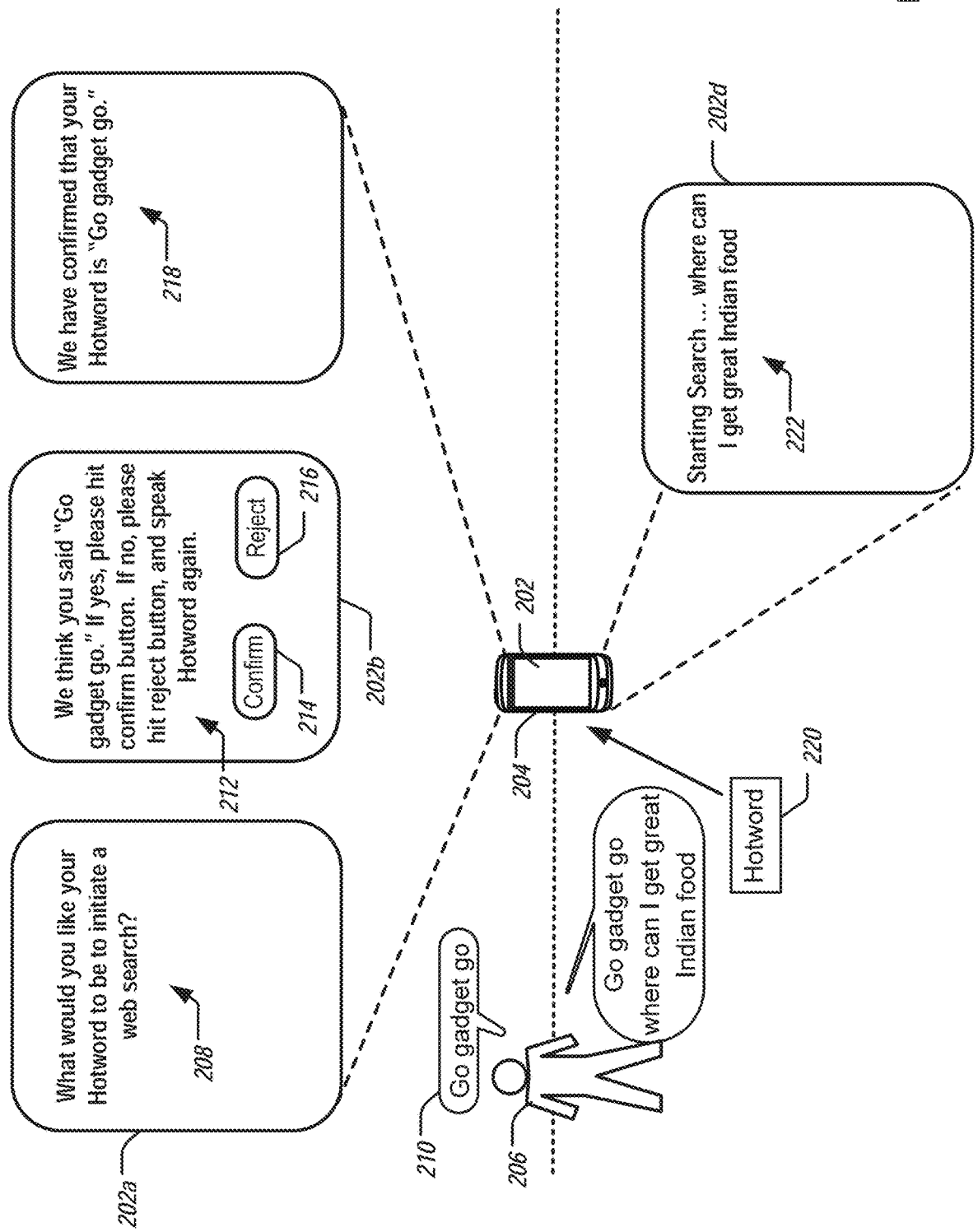
FIG. 2 depicts an example graphical user interface for identifying a user provided hotword.

FIG. 2 illustrates example graphical user interface (GUI) 202 of a mobile computing device 204 for identifying a user provided hotword. The mobile computing device 204 can be similar to the mobile computing device 106 of FIG. 1. To that end, the mobile computing device 204 provides a first GUI 202a to a user 206 associated with the mobile computing device 204 that provides for display initiation of the process to identify the user provided hotword to be associated with an action (e.g., a process performed at least partially by the mobile computing device 204). In some examples, the first GUI 202a includes text 208 indicating to the user 206 to provide a hotword. For example, the text 208 includes "What would you like your Hotword to be to initiate a web search?" The user 206 provides an utterance 210 that the mobile computing device 204 detects. For example, the user 206 says the utterance 210 of "go gadget go" that the user 206 desires to be a hotword to initiate a web search.

In response to detecting the utterance 210, the mobile computing device 204 provides a second GUI 202b to the user 206 that provides for display a proposed transcription of the detected utterance 210. In some examples, the second GUI 202b includes text 212 indicating to the user 206 to confirm, or reject, a transcription of the utterance 210. For example, the text 212 includes "We think you said 'Go gadget go.' If yes, please hit confirm button. If no, please hit reject button, and speak Hotword again." To that end, the second GUI 202b further includes selectable buttons 214 and 216 that the user 206 is able to select to indicate whether to confirm that the transcription is correct, or reject the transcription. For example, upon selection of the selectable button 214 by the user 206, the mobile computing device 204 receives a confirmation that the transcription of "Go gadget go" corresponds to the utterance 210. Further, for example, upon selection of the selectable button 216 by the user 206, the mobile computing device 204 receives a rejection of the transcription corresponding to the utterance 210, e.g., an incorrect or inaccurate transcription. In some examples, the proposed transcription of the detected utterance 210 is not provided to the user 206 via the second GUI 202b.

In response to receiving a confirmation that the transcription is correct, the mobile computing device 204 provides a third GUI 202c to the user 206 that provides for display a confirmation of the transcription of the detected utterance 210. In some examples, the third GUI 202c includes text 218 indicating to the user 206 that the user 206 has confirmed that the transcription of the utterance 210 is correct. For example, the text 218 includes "We have confirmed that your Hotword is 'Go gadget go.'" Thus, the words "Go gadget go" have been established as associated with a hotword, and further associated with an action of initiating a web search.

After establishing the hotword by the user 206, the user 206 can provide a hotword 220, e.g., via an utterance or text-input, to the mobile computing device 206, e.g., after identifying the user provided hotword. For example, the hotword 220 can include the words "go gadget go." Thus, in response to receiving the hotword 220 of "go gadget go," the mobile computing device 206 causes one or more actions to be performed, including initiating a web search, and provides a fourth GUI 202d to the user 206 that provides for display a description of the action to be taken associated with receiving the hotword 220. In some examples, the fourth GUI 202d includes text 222 of "Starting Search . . . ."

Figure 3:
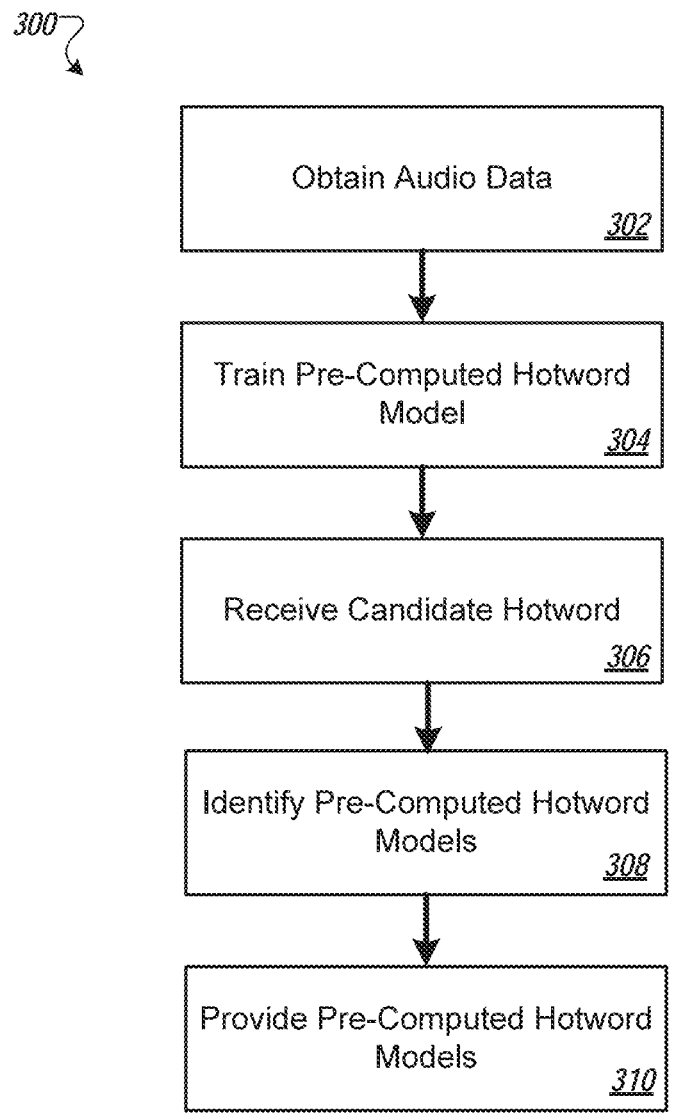
FIG. 3 depicts an example flowchart for providing hotword models.

FIG. 3 depicts a flowchart of an example process 300 for providing hotword models. The example process 300 can be executed using one or more computing devices. For example, the mobile computing device 102, 104, 106, the speech recognition engine 108, and the hotword configuration engine 112 can be used to execute the example process 500.

For each of multiple words or sub-words, audio data corresponding to multiple users speaking the word or sub-word is obtained (302). For example, the speech recognition engine 208 obtains the waveforms 120 and 122 from the mobile computing devices 102 and 104, respectively, that correspond to the user 114 speaking the utterance 150 of "start my car" and the user 116 speaking the utterance 152 of "where do I buy a computer." For each of the multiple words or sub-words, a pre-computed hotword model for the word or sub-word is trained based on the audio for the word or sub-word (304). For example, the hotword configuration engine 112 trains a pre-computed hotword model for each word or sub-word based on the waveforms 120 and 122. A candidate hotword is received from a mobile computing device (306). For example, the hotword configuration engine 112 receives the candidate hotword 129 of "start computer" from the mobile computing device 106. One or more pre-computed hotword models are identified that correspond to the candidate hotword (308). For example, the hotword configuration engine 112 identifies the pre-computed hotword models 128 stored by the vocabulary database 110 that correspond to the candidate hotword 129 of "start computer." The identified, pre-computed hotword models are provided to the mobile computing device (310). For example, the hotword configuration engine 112 provides the pre-computed hotword models 134 to the mobile computing device 106.

Figure 4:
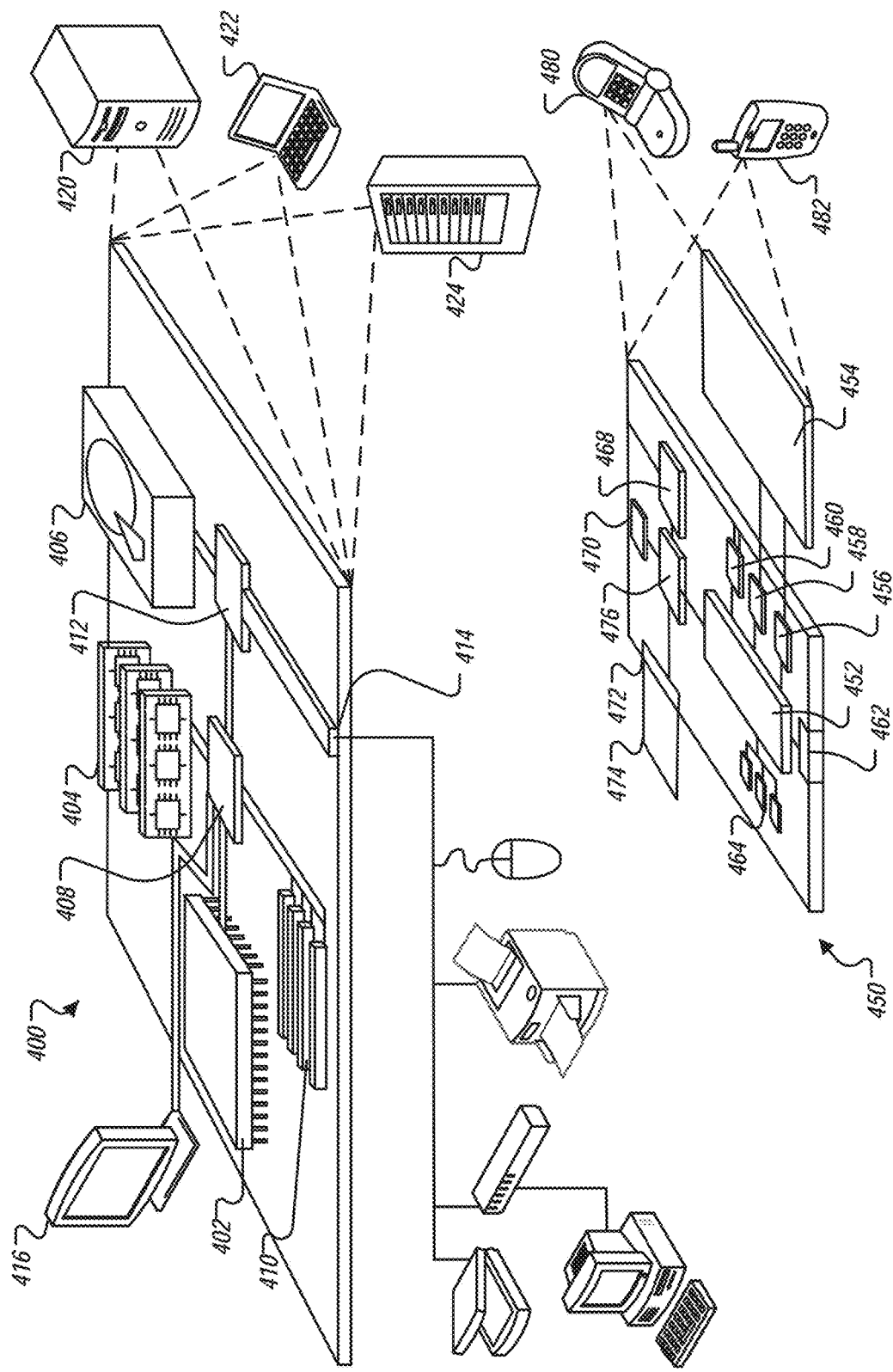
FIG. 4 depicts a computer device and a mobile computer device that may be used to implement the techniques described here.

FIG. 4 shows an example of a generic computer device 400 and a generic mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 may process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 404, the storage device 406, or a memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 may execute instructions within the computing device 640, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 648 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 may be implemented as one or more of a computer-readable medium or media, a volatile memory unit or units, or a non-volatile memory unit or units. Expansion memory 454 may also be provided and connected to device 450 through expansion interface 452, which may include, for example, a SIMM (Single In Line Memory Module) card interface. Such expansion memory 454 may provide extra storage space for device 450, or may also store applications or other information for device 450. Specifically, expansion memory 454 may include instructions to carry out or supplement the processes described above, and may include secure information also. Thus, for example, expansion memory 454 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 454, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 450 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A method comprising:
receiving, at data processing hardware, from a user device, text corresponding to a personalized term for initiating the user device to perform a particular action, the user device configured to:
receive, in a graphical user interface executing on the user device, an input indication corresponding to a user entering the text corresponding to the personalized term; and
send the text corresponding to the personalized term to the data processing hardware;
receiving, at the data processing hardware, from the user device, audio data corresponding to an utterance spoken by the user; and
when the personalized term is detected in the utterance spoken by the user, initiating, by the data processing hardware, the user device to perform the particular action.

2. The method of claim 1, wherein the user device is further configured to, prior to receiving the input indication in the graphical user interface, display a prompt in the graphical user interface, the prompt requesting the user to provide the personalized term.

3. The method of claim 1, further comprising, prior to receiving the audio data corresponding to the utterance spoken by the user, obtaining, by the data processing hardware, using the text corresponding to the personalized term, a detection model that corresponds to the personalized term.

4. The method of claim 3, further comprising detecting, by the data processing hardware, using the obtained detection model, the personalized term in the audio data corresponding to the utterance spoken by the user.

5. The method of claim 3, wherein obtaining the detection model comprises dynamically creating the detection model based on the received text corresponding to the personalized term.

6. The method of claim 3, wherein obtaining the detection model comprises retrieving the detection model that corresponds to the personalized term from a vocabulary database.

7. The method of claim 6, further comprising storing, by the data processing hardware, the detection model in the vocabulary database prior to receiving the text corresponding to personalized term.

8. The method of claim 3, wherein the detection model is trained based on portions of audio samples of other users speaking other words that are not the personalized term.

9. The method of claim 1, wherein the personalized term comprises two or more words.

10. The method of claim 1, wherein the personalized term comprises a single word.

11. A system comprising:
data processing hardware; and
memory hardware in communication with the data processing hardware and storing instructions that when executed by the data processing hardware cause the data processing hardware to perform operations comprising:
receiving, from a user device, text corresponding to a personalized term for initiating the user device to perform a particular action, the user device configured to:
receive, in a graphical user interface executing on the user device, an input indication corresponding to a user entering the text corresponding to the personalized term; and
send the text corresponding to the personalized term to the data processing hardware;
receiving, from the user device, audio data corresponding to an utterance spoken by the user; and
when the personalized term is detected in the utterance spoken by the user, initiating the user device to perform the particular action.

12. The system of claim 11, wherein the user device is further configured to, prior to receiving the input indication in the graphical user interface, display a prompt in the graphical user interface, the prompt requesting the user to provide the personalized term.

13. The system of claim 11, wherein the operations further comprise, prior to receiving the audio data corresponding to the utterance spoken by the user, obtaining, using the text corresponding to the personalized term, a detection model that corresponds to the personalized term.

14. The system of claim 13, wherein the operations further comprise detecting, using the obtained detection model, the personalized term in the audio data corresponding to the utterance spoken by the user.

15. The system of claim 13, wherein obtaining the detection model comprises dynamically creating the detection model based on the received text corresponding to the personalized term.

16. The system of claim 13, wherein obtaining the detection model comprises retrieving the detection model that corresponds to the personalized term from a vocabulary database.

17. The system of claim 16, wherein the operations further comprise storing the detection model in the vocabulary database prior to receiving the text corresponding to personalized term.

18. The system of claim 13, wherein the detection model is trained based on portions of audio samples of other users speaking other words that are not the personalized term.

19. The system of claim 11, wherein the personalized term comprises two or more words.

20. The system of claim 11, wherein the personalized term comprises a single word.

* * * * *